Dec. 31, 1946.　　　　I. E. KIDWELL　　　　2,413,454
VENDING MACHINE
Filed July 13, 1942　　　　2 Sheets-Sheet 1
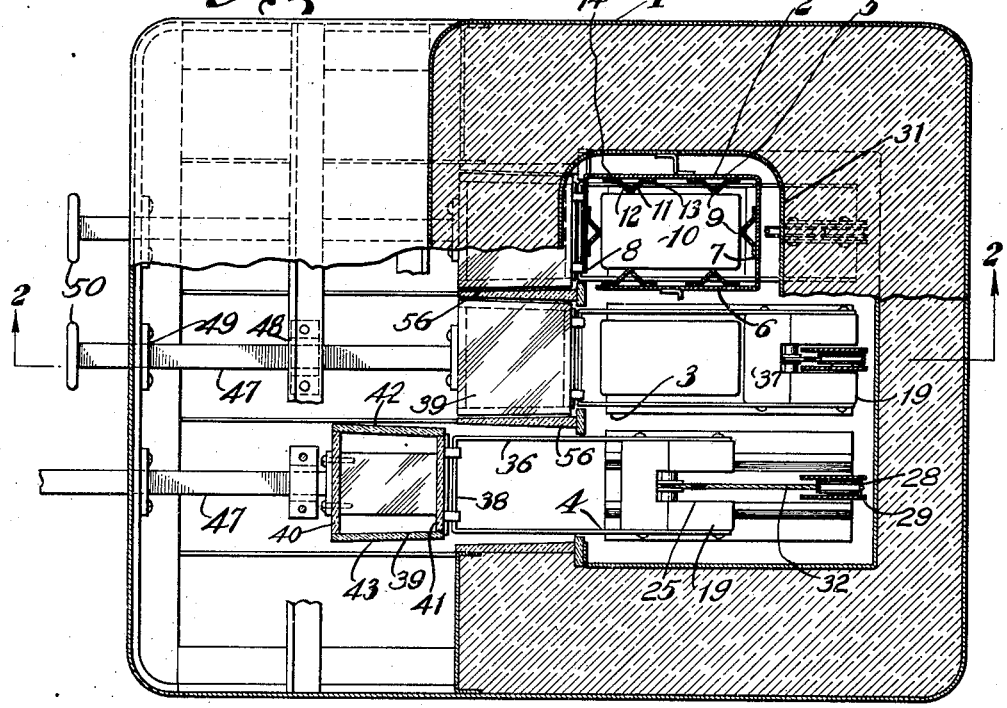
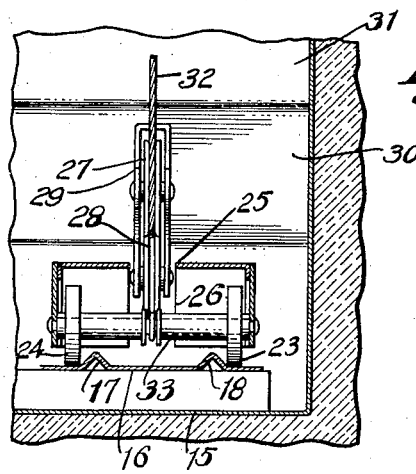
INVENTOR:
IVAL E. KIDWELL,
BY
ATTORNEY.

Dec. 31, 1946.    I. E. KIDWELL    2,413,454
VENDING MACHINE
Filed July 13, 1942    2 Sheets-Sheet 2

INVENTOR;
IVAL E. KIDWELL;
BY
ATTORNEY.

Patented Dec. 31, 1946

2,413,454

UNITED STATES PATENT OFFICE 2,413,454

VENDING MACHINE

Ival E. Kidwell, Los Angeles, Calif.

Application July 13, 1942, Serial No. 450,662

2 Claims. (Cl. 312—67)

This invention relates to vending machines, and particularly to a type of vending machine adapted to dispense ice cream bars.

At the present time, there are various ice cream and ice milk bars on the market which are dispensed by coin operated machines. These machines do not always function satisfactorily, in that the ice milk or ice cream bar is not always maintained properly frozen, or the dispensing apparatus fails to function properly.

An object of the present invention is the provision of an ice cream or commodity dispensing machine which overcomes the defects above set forth.

With the machine of the present invention, I provide suitable compartments or wells for housing stacked bars, such as ice cream. These compartments are refrigerated and the arrangement is such that the bar to be dispensed is properly refrigerated.

As packaged bars sometimes freeze together, which renders the dispensing thereof difficult, an object of the present invention is the provision of suitable means whereby the above mentioned difficulty is effectively overcome and the dispensing of bars accomplished in an easy and efficient manner.

Another object of the invention is the provision of an ice cream dispenser wherein the parts are so arranged as to properly insulate the same against outside heat influence so that no appreciable loss of cold occurs during a dispensing of ice cream bars from the machine.

Another object is the provision of novel means for separating stacked refrigerated bars.

Another object is the provision of simple and effective means to prevent unauthorized tampering with the machine.

Other objects include a dispensing machine which is inexpensive in cost of manufacture, sightly in appearance, fool proof in operation, and generally superior.

With the above mentioned and other objects in view, the invention consists in the novel and useful provision, formation, construction, association, and relative arrangement of parts, members and features, all as shown in one embodiment in the accompanying drawings, described generally, and more particularly pointed out in the claims.

In the drawings:

Figure 1 is a transverse sectional view, partly in fragment, of the invention,

Figure 2:
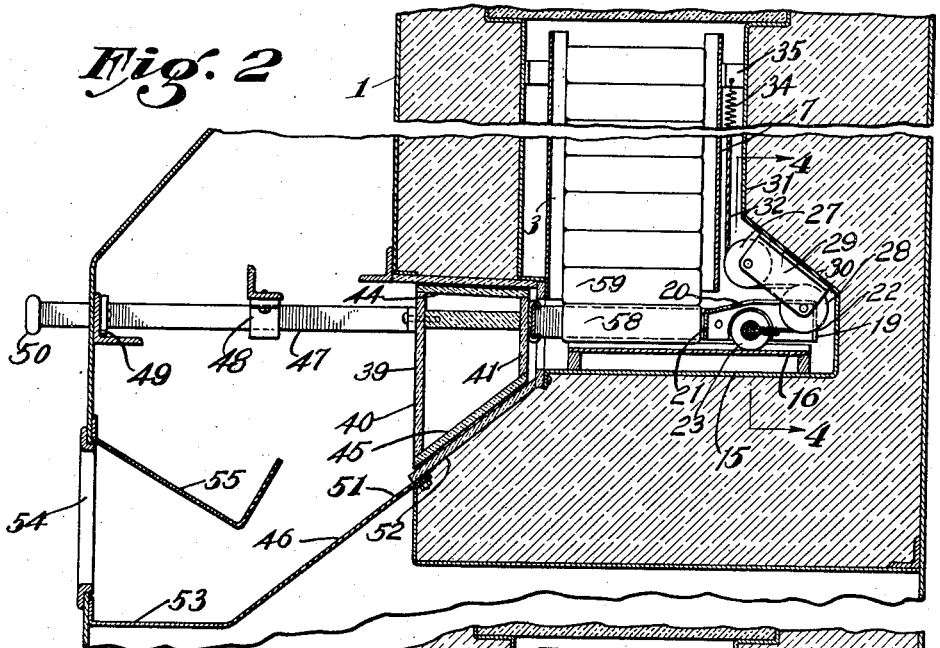
Figure 2 is a fragmentary sectional view on the line 2—2 of Figure 1.

Referring now to the drawings, 1 is an external case which may be of sheet metal or other material, and encloses the mechanism. The mechanism includes some form of refrigeration apparatus, such as a compressor, motor, coil, and associated elements, for the purpose of maintaining the device in a chilled condition.

The present invention does not relate specifically to any refrigerating means, but more specifically relates to the arrangement of the compartments or wells adapted to hold a commodity, such as ice cream bars, to be dispensed from the machine. Machines of this character ordinarily require the deposit of a coin in a suitable slot, which will permit actuation of a member to release the commodity, one at a time. The device includes any number of compartments for holding bars of the commodity, such as ice cream. In the present instance, I have shown three compartments at 2, 3 and 4. All of the compartments are identically constructed and may be defined as "wells." Each compartment or well includes two substantially parallel side and end walls 5, 6, 7 and 8, provided with spaced parallel guide members 9. These guide members extend lengthwise of the walls and are so constructed as to have point contact with the commodity 10. This point contact of the guide members is accomplished by bending a metal strip to provide two angular sides 11 and 12, the sides terminating in foot portions 13 and 14, which lie in the same plane and are attached by welding or otherwise, to the side and end walls of the well. The apex or the point of bend between the two side members 11 and 12 forms the zone of contact with the commodity.

Ordinarily, ice cream bars are placed in boxes of uniform size and thickness. It is contemplated that boxes will be used in the present instance, and that the boxes holding the commodity will be placed in the well or compartment in stacked relationship. The guide means 9 will maintain the boxes substantially in alignment in the well. The side walls of each well or compartment terminate above what may be termed the dispensing outlet for the commodity, reference being had to Figure 2. At this zone, the interior of the machine is so constructed as to provide a wall 15 substantially at right angles to the sides of the well or compartment and mounted thereon is a platform 16. This platform is provided with a pair of spaced-apart parallel raised portions 17 and 18, which form guide rails for a plunger adapted to move, in sequence, a commodity from the well or compartment. This plunger includes a block 19 formed of sheet metal or other material, a portion of the top surface 20 being inclined relative to the front and rear walls 21 and 22 of the block. The block is mounted on rollers or wheels 23 and 24, the wheels straddling the guide rails 17 and 18. The inclined top surface 20 and the rear wall 19 of the block are slotted at 25 and 26. The slot 25 does not extend throughout the length of the inclined wall.

A pair of pulleys 27 and 28 mounted in a suitable bracket 29 are secured to a wall 30, which may form a continuation of the member forming the wall 15, and this wall 30 merges with a wall 31 which is substantially parallel with and spaced from the rear wall 7 of the well or compartment. A cable 32 passes over the pulleys 27 and 28 and is secured at one end to a sleeve 33, which extends between the wheels 23 and 24, this cable being positioned midway of said sleeve, as best shown in Figure 4. The opposite end of the cable is fastened to one end of a coil spring 34, the opposite end of the coil spring being secured to a support 35. The arrangement is such that pulleys 27 and 28 are out of position of contact with the compartment or well, but so positioned that the pulley 28 may be received within the slots 25 and 26 when the plunger has been moved to the position of Figure 2 under influence of the spring 34. A U-shaped strap 36 has its sides secured to sides of the plunger block and this strap is of sufficient size to accommodate one of the commodities when the plunger is at its innermost position as, for instance, illustrated for the plunger shown in Figure 1 at 37.

The front portion 38 of the strap has a closure member 39 secured thereto. This closure member is in the form of a boxing, although it may be solid. In the present instance, the boxing includes front and rear substantially parallel members 40 and 41, and side members 42 and 43, which are angularly related to each other and to the front and rear members. In other words, the sides form a wedge construction. This member 39 also includes a top member 44 and a bottom member 45. The bottom member is inclined or at an angle to the front and rear members 40 and 41. The angularity of the member 45 will depend upon the angularity of the "chute" 46.

The material used in the construction of the member 39 is not important, although it may be of a plastic and filled with some insulating material, such as cork. Forwardly of the member 39 and secured thereto is a pull rod 47. This pull rod is in the form of a strap and is passed through suitable guides at 48 and 49 in the casing 1; the outermost end of said pull rod is provided with a finger hold 50.

The member 15 merges with the chute 46, which includes an inclined wall 51 of metal or other material, which in turn has secured thereto a plastic inclined wall 52, which joins member 15. The member 51 is bent to provide a receptacle portion 53 where the commodity will rest after the plunger has been operated, upon movement of the pull rod.

The front of the casing is provided with an opening at 54, through which the hand may pass for securing the commodity. A guard plate 55 prevents unauthorized tampering with the device and likewise prevents the hand from entering sufficiently far to permit contact with member 39.

As is usual practice in devices of this character, suitable insulating material, such as rock wool, cork, or other material, is interposed between the outer casing 1 and the walls bounding the compartments or wells. There is, of course, no insulation at the zone of the closure members. However, taper sectioned partitions 56 are at the zone of entrance to the wells or compartments and cooperate with the taper side walls of the closure members 39 to prevent heat transfer at this zone. It is, of course, realized that the opening 54 communicates both internally and externally of the cabinet.

Figure 3:
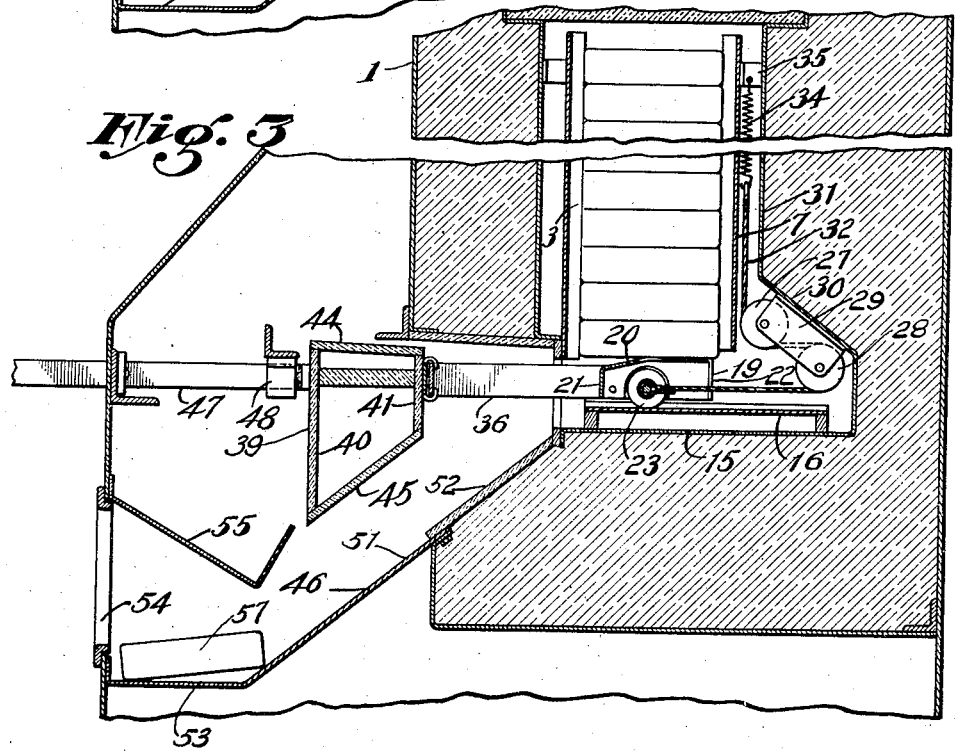
Figure 3 is a view similar to Figure 2, certain parts being in changed position, and, Figure 4 is a sectional view on the line 4—4 of Figure 2.

The operation, uses and advantages of the invention are as follows:

A feature of the present invention resides in the arrangement of the apparatus for discharging the commodity from the wells. This apparatus provides a minimum of movement to drop a bar onto the chute and dispose the same on the portion 53 as, for instance, shown in Figure 3, at 57. Assuming that a coin has been dropped into a suitable slot, to release locking mechanism which holds the plungers against movement, the fingers may grasp a member 50 of the pull rod and upon pulling straight outwardly, the plunger will be moved from the position shown in Figure 2 to that of Figure 3. The stacked bars shown in Figure 2 drop under influence of gravity so as to deposit the lowermost bar on the top of the guide rails 17 and 18 and within the confines of the strap 36. When the pull rod is first moved, it is evident that the front wall or nose 21 of the plunger will contact the lowermost bar 58 and move the same relative to the bar 59 which rests thereon. As the bar 58 is moved outwardly, the inclined top surface of the plunger will contact the bottom surface of the bar 59 and elevate this bar and the stacked bars thereabove, effectively releasing member 58 from contact with member 59. In this respect, it will be observed that the inclined surface of the plunger elevates the remaining bars of the stack above the normal level of the top surface of the lowermost bar, which is bar 58. After bar 58 has moved a certain distance on the guide rails 17 and 18, it will drop onto the chute. The spring 34 is now in tension, as shown in Figure 3, and will thus urge the plunger to return to the position shown in Figure 2. Inasmuch as the top surface of the plunger is inclined, the weight of the stack of bars will urge the plunger to return. This raising of the stack of bars as the plunger moves forwardly and then allowing the stack of bars to drop to position the lowermost bar in the space bounded by the U-shaped strap 36 jars the stacked bars and tends to break or separate the same, if for any reason the bars have become frozen together.

I claim:

1. In a dispensing machine for ice cream bars and other commodities, a well within which the bars to be dispensed are stacked, a platform beneath said well, said platform provided with a pair of spaced guide rails of inverted V-shaped cross section, a wheeled plunger carried on said platform and straddling said guide rails, bar receiving means comprising a U-shaped strap secured to said plunger and normally positioned beneath said well for receiving the lowermost bar of said stack, the said bar being supported on said guide rails, the inverted V-shaped cross section of said rails providing a point contact therewith, and means for moving said bar receiving means and said plunger transversely of the well to remove the lowermost bar from said stack.

2. The machine set forth in claim 1, characterized in that the plunger is provided with top and bottom parallel surfaces, the distance therebetween being greater than the thickness of any bar of the stack of bars, and with an inclined surface adapted to engage the bar positioned above the lowermost bar of said stack to progressively raise said stack onto the top surface as the plunger is moved outwardly to discharge the lowermost bar.

IVAL E. KIDWELL.